(12) United States Patent
Peng et al.

(10) Patent No.: US 12,715,800 B2
(45) Date of Patent: Aug. 25, 2026

(54) METHOD FOR REALIZING ADVANCED NITROGEN REMOVAL OF DOMESTIC SEWAGE VIA TWO STAGE PARTIAL NITRIFICATION-ANAMMOX COUPLED WITH SULFUR AUTOTROPHIC DENITRIFICATION

(71) Applicant: BEIJING UNIVERSITY OF TECHNOLOGY, Beijing (CN)

(72) Inventors: Yongzhen Peng, Beijing (CN); Yueru Zhao, Beijing (CN); Qiong Zhang, Beijing (CN); Xiyao Li, Beijing (CN)

(*) Notice: Subject to any disclaimer, the term of this patent is extended or adjusted under 35 U.S.C. 154(b) by 338 days.

(21) Appl. No.: 17/631,420

(22) PCT Filed: Jul. 21, 2021

(86) PCT No.: PCT/CN2021/107610
§ 371 (c)(1),
(2) Date: Jan. 28, 2022

(87) PCT Pub. No.: WO2022/062615
PCT Pub. Date: Mar. 31, 2022

(65) Prior Publication Data

US 2025/0136486 A1 May 1, 2025

(30) Foreign Application Priority Data

Sep. 24, 2020 (CN) .......................... 202011011160.8

(51) Int. Cl.
*C02F 3/30* (2023.01)
*C02F 3/34* (2023.01)
*C02F 101/16* (2006.01)

(52) U.S. Cl.
CPC .............. *C02F 3/307* (2013.01); *C02F 3/303* (2013.01); *C02F 3/305* (2013.01); *C02F 3/34* (2013.01); *C02F 2101/163* (2013.01)

(58) Field of Classification Search
None
See application file for complete search history.

(56) References Cited

PUBLICATIONS

CN110563271 Peng et al.—Realizing deep nitrogen removal (Abstract & MT; Dec. 13, 2019). (Year: 2019).*

(Continued)

*Primary Examiner* — Hayden Brewster
(74) *Attorney, Agent, or Firm* — Barber Legal; Craig W. Barber

(57) ABSTRACT

A biological treatment of sewage device and method for realizing advanced nitrogen removal of domestic sewage by half partical nitrification-anammox coupled with sulfur autotrophic denitrification. The device includes a raw water tank, a half partical nitrification reactor, a regulating water tank and an anammox coupled denitrification reactor. The domestic sewage enters the half partical nitrification reactor, a mass concentration ratio of $NO_2^-$—N to $NH_4^+$—N in effluent water is 1-1.32 through real-time control, and then the effluent water enters the intermediate water tank. After it enters the upflow anammox coupled with autotrophic denitrification granular sludge reactor, the synergistic reaction of anammox and sulfur autotrophic denitrification in the reactor achieves the nitrogen removal. The device and the method improve denitrification efficiency by making full use of the synergistic effect between microorganisms, thereby realizing high-efficiency and energy-saving advanced nitrogen removal of municipal sewage.

1 Claim, 1 Drawing Sheet

(56) References Cited

PUBLICATIONS

CN102923853 Li et al.—Sulfur autotrophic denitrification—(Abstract & MT; Feb. 13, 2013) (Year: 2013).*

* cited by examiner

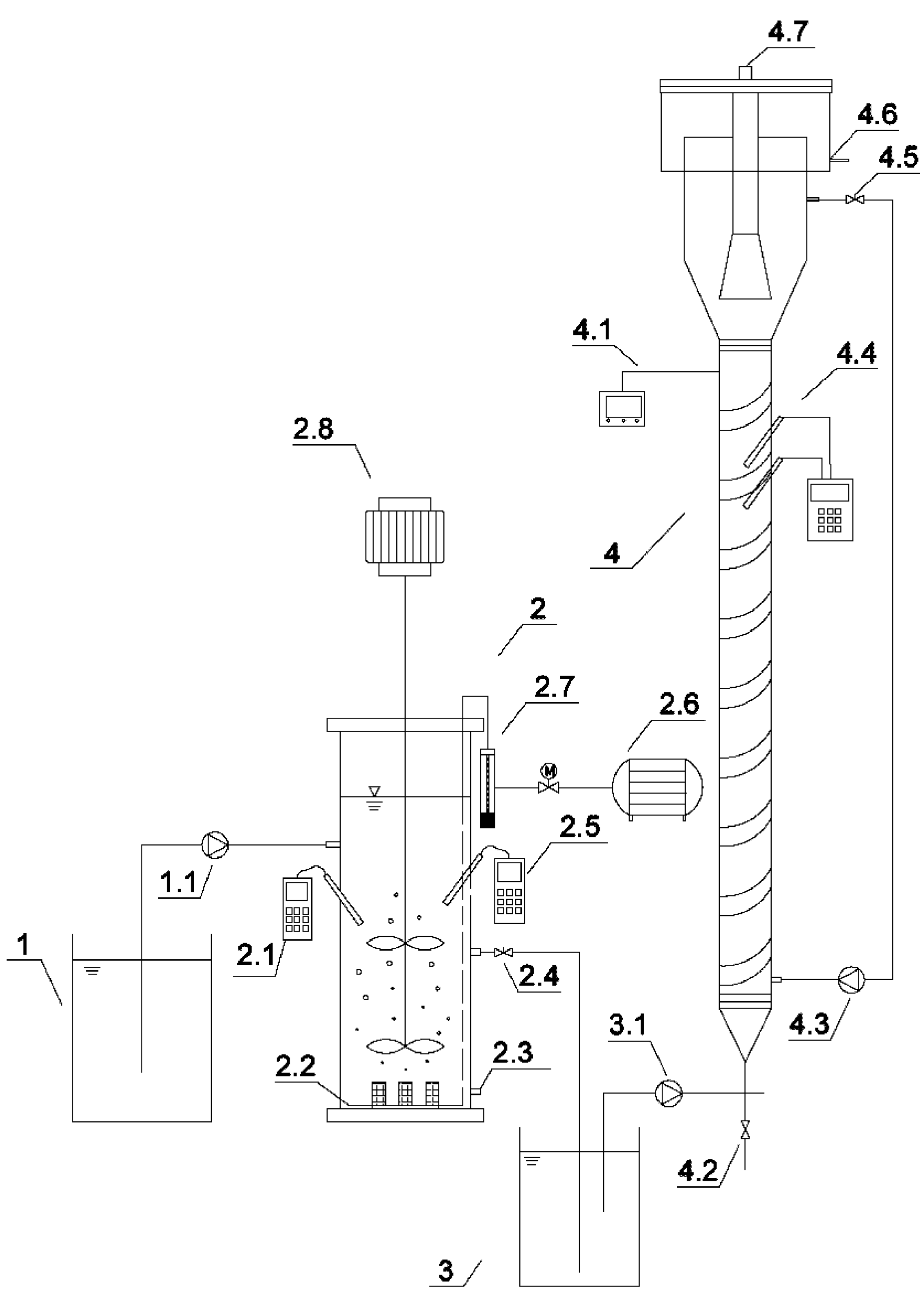
4.7
4.6
4.5
4.1
4.4
2.8
4
2
2.7
2.6
2.5
1.1
1
2.1
2.4
3.1
4.3
2.2
2.3
4.2
3

METHOD FOR REALIZING ADVANCED NITROGEN REMOVAL OF DOMESTIC SEWAGE VIA TWO STAGE PARTIAL NITRIFICATION-ANAMMOX COUPLED WITH SULFUR AUTOTROPHIC DENITRIFICATION

CROSS REFERENCE TO RELATED APPLICATIONS

The application claims the priority of Chinese patent application No. 202011011160.8, filed to CNPIA on Sep. 24, 2020 and entitled "Device and Method for Realizing Advanced Nitrogen Removal of Domestic Sewage Via two stage Partical Nitrification-Anammox Coupled with Autotrophic Denitrification", which is incorporated herein by reference in its entirety.

TECHNICAL FIELD OF INVENTION

The present application relates to a device and method for realizing advanced nitrogen removal of domestic sewage by partical nitrification-anammox coupled with autotrophic denitrification, which belongs to the field of biological treatment of sewage. The device and the method are suitable for advanced nitrogen removal of municipal sewage with a low C/N ratio.

BACKGROUND

Human activities have produced a large amount of wastewater, which contains various elemental by-products including C, N, P, and the like, resulting in nitrogen and phosphorus contamination of water bodies. Nitrogen in domestic sewage exists mainly in the form of organic nitrogen and ammonia nitrogen, which not only poses a great threat to human health, and also causes eutrophication of water bodies. It damages the ecological environment, and causes a shortage of water resources. The traditional nitrification-denitrification sewage biological treatment technology has the problems of high energy consumption and low denitrification efficiency. In order to realize the sustainable development of wastewater treatment, the problems can be solved by a low-consumption and high-efficiency anammox process, and the anammox reaction will produce $NO_3^-$—N, so it is a common choice to couple anammox with denitrification. Sulfur autotrophic denitrification takes advantage of the unique metabolic characteristics of denitrifying and desulfurizing bacteria such as Thiobacillus denitrificans, which takes reducing sulfur compounds as electron donors and energy, and takes $NO_3^-$—N or $NO_2^-$—N as electron acceptors. In this experiment, partical nitrification effluent water is used to provide $NH_4^+$—N and $NO_2^-$—N for anammox at the front end. Sulfur autotrophic denitrification is coupled with anammox based on the chemoautotrophy characteristics of sulfur autotrophic denitrifying bacteria at the back end, which has the advantages of saving aeration and low sludge yield.

Partical nitrification means that the traditional nitrification process is controlled in an ammonia oxidation stage, which can be achieved by real-time control, i.e. During the nitrification, when an ammonia oxidation reaction ends, $H^+$ is no longer produced in the system, a pH change curve exhibits an inflection point from decline to rise, that is, an "ammonia nitrogen valley point". The pH change in the system can be monitored in real time, and aeration is stopped when the pH curve reaches the "ammonia nitrogen valley point". Use this point to control the nitrification reaction in the ammonia oxidation stage, provide the substrate $NO_2^-$—N for the anammox reaction. For partical nitrification, aeration needs to be stopped before an ammonia nitrogen valley point to achieve a mass concentration ratio of $NH_4^+$—N to $NO_2^-$—N in effluent water being 1-1.32.

Sulfur autotrophic denitrification can employ a variety of electron donors, wherein FeS as an electron donor has no toxic effect on anammox bacteria during autotrophic denitrification, and the two types of bacteria are chemoautotrophic microorganisms with $CO_2$ as a carbon source. Therefore, the complementarity of metabolic pathways and the consistency of proliferation rates of the two types of bacteria can achieve a stable coexistence relationship. Not only this two types of bacteria can synergistically remove total nitrogen from the system, but also they can improve the removal rate of total nitrogen in the system, thereby improving the quality of effluent water.

SUMMARY

The present application provides a device and method for realizing advanced nitrogen removal of municipal sewage by half partical nitrification-anammox coupled with sulfur autotrophic denitrification, and aims to solve the problem of insufficient carbon source in the traditional sewage treatment process while improving the quality of effluent water.

1. A device for treatment of municipal sewage by half partical nitrification-anammox coupled with sulfur autotrophic denitrification, wherein the device is provided with a raw water tank (1), a half partical nitrification reactor (2), an intermediate water tank (3) and an upflow anammox coupled with autotrophic denitrification granular sludge reactor (4): the raw water tank (1) is provided with a water inlet pump I; the half partical nitrification reactor (2) is provided with a PH meter (2.1), an aeration device (2.2), a dissolved oxygen (DO) meter (2.5), a gas flowmeter (2.7), an air pump (2.6), a stirring device (2.8), a drain valve (2.4) and a sludge discharge valve (2.3); the intermediate water tank (3) is provided with a water inlet pump II; the upflow anammox coupled with autotrophic denitrification granular sludge reactor (4) is provided with a temperature control device (4.1), a pH/DO meter (4.4), a U-shaped outlet pipe (4.6) and a gas collecting port (4.7);

connection of an experimental device: the raw water tank (1) is connected with a water inlet of a half partical nitrification reactor (2) via the water inlet pump I (1.1); a water outlet of the half partical nitrification reactor (2) is connected with the intermediate water tank (3) via the drain valve (2.4); a water inlet of the upflow anammox coupled with autotrophic denitrification granular sludge reactor (4) is connected with the intermediate water tank (3) via the water inlet pump II (3.1), and water is drained from a water outlet of the upflow anammox coupled with autotrophic denitrification granular sludge reactor (4) via the U-shaped outlet pipe (4.6).

1. A device for treatment of domestic sewage by half partical nitrification-anammox coupled with sulfur autotrophic denitrification, wherein the device is provided with a raw water tank (1), a half partical nitrification reactor (2), an intermediate water tank (3) and an upflow anammox coupled with autotrophic denitrification granular sludge reactor (4): the raw water tank (1) is provided with a water inlet pump I; a half partical nitrification reactor (2) is provided with a pH meter (2.1), an aeration device (2.2), a dissolved oxygen (DO) meter (2.5), a gas flowmeter (2.7), an air pump (2.6), a stirring device (2.8), a drain valve (2.4) and a sludge discharge valve (2.3); the intermediate water tank (3) is provided with a water inlet pump II; an upflow anammox coupled with autotrophic denitrification granular sludge reactor (4) is provided with a temperature control device (4.1), a pH/DO meter (4.4), a U-shaped outlet pipe (4.6) and a gas collecting port (4.7).

connection of an experimental device: the raw water tank (1) is connected with a water inlet of the half partical nitrification reactor (2) via the water inlet pump I (1.1); a water outlet of the half partical nitrification reactor (2) is connected with the intermediate water tank (3) via the drain valve (2.4); a water inlet of the upflow anammox coupled with autotrophic denitrification granular sludge reactor (4) is connected with the intermediate water tank (3) via the water inlet pump II (3.1), and water is drained from a water outlet of the upflow anammox coupled with autotrophic denitrification granular sludge reactor (4) via the U-shaped outlet pipe (4.6).

2. Experimental Steps (1) System Startup:

(1.1) startup of the half partical nitrification reactor: inoculating with partical nitrification floc sludge, which controlling the sludge concentration to be 2500-3000 mg/L, a hydraulic retention time to be 4-5 h, and a sludge age to be 10-15 d. The domesticsewage from the raw water tank into a reactor by a inlet pump per cycle, stirring under low-oxygen aeration. Precipitation and then drainage water, wherein dissolved oxygen in the reactor is controlled to be 0.5-2.0 mg/L, and the drainage ratio is 50%. The start-up process of the half partical nitrification SBR reactor is completed when a mass concentration ratio of $NH_4^+$—N to $NO_2^-$—N in effluent water of a half partical nitrification sequencing batch reactor (SBR) is 1-1.3, and the effluent water of the half partical nitrification SBR reactor is discharged into a regulating water tank; and (1.2) startup of the upflow anammox coupled with autotrophic denitrification granular sludge reactor: ① inoculating with anammox granular sludge, wherein the sludge has an average particle size of 0.3-0.5 mm; not actively draining sludge during operation; and controlling the temperature inside the reactor to be 30±1° C. by a temperature control device; ② performing enrichment culture on autotrophic denitrifying bacteria in an anoxic upflow anaerobic sludge blanket (UASB) reactor using simulated wastewater prepared from 30-50 mg/L of $Na_2S_2O_3$ and 20-40 mg/L of $NaNO_3$ as inlet water, controlling the temperature inside the reactor to be 30±1° C. by the temperature control device, and adjusting a pH to 7-8; and fully enriching functional microorganisms after culture for 3 months or above, and collecting a sludge sample for identification of a microbial community structure and analysis of microbial abundance in the sludge, wherein when the flora abundance is greater than 10%, the culture is completed; and 3 mixing anammox sludge with denitrification sludge according to sludge concentration, wherein the concentration of the anammox sludge is greater than or equal to 5 times of the concentration of the denitrification sludge; adding FeS into the mixed sludge, wherein the mass concentration of FeS added in each 1 L reactor is 10-20% of the mass concentration of ammonia nitrogen in inlet water in the reactor; after mixing, controlling the concentration of sludge in the reactor to be 4000-5000 mg/L, the rising flow rate to be 0.5 m/h, and the hydraulic retention time to be 150-160 min. Among them, the reactor startup was considered to be successful when both the concentration of $NH_4^+$—N and the concentration of $NO_2^-$—N in effluent water of the reactor are less than 5 mg/L; and (2) Operation After Successful Startup:

(2.1) allowing domestic sewage to enter the half partical nitrification reactor via the water inlet pump I, starting anoxic/oxic (AO) operation, and allowing the SBR reactor to undergo five processes of water inlet, reaction, standing, precipitation, and water outlet. Anaerobic stirring Specifically performing after the water inlet, and carrying out a reaction for 30-60 min to remove organic matters in water; then, starting the air pump, performing aerobic stirring, controlling dissolved oxygen to be 0.3-2 mg/L by adjusting the gas flowmeter, and carrying out a half partical nitrification reaction for 3-4 h; and allowing the stirred material to stand for precipitation for 30-60 min after stirring was finished and the opening the drain valve. Regular discharge sludge to controle the sludge age to be 10-15 d, wherein a drainage ratio is 50%, and the mass concentration ratio of $NH_4^+$—N to $NO_2^-$—N in reaction effluent water is 1-1.32; and (2.2) allowing SBR effluent water containing $NH_4^+$—N and $NO_2^-$—N to enter the intermediate water tank, and pumping sewage of the intermediate water tank into the anammox coupled denitrification reactor by the water inlet pump II; controlling the hydraulic retention time of the UASB to be 3-6 h, i.e., controlling the flow rate to be 1 L/h-3 L/h; not actively draining sludge during operation; controlling the temperature inside the reactor to 30±1° C. by the temperature control device; converting $NH_4^+$—N and $NO_2^-$—N in inlet water to $N_2$ under the action of anammox bacteria in the reactor; while using FeS as an electron donor of autotrophic denitrifying bacteria to react with $NO_3^-$—N to produce $NO_2^-$—N, which is further used for anammox, thereby achieving advanced nitrogen removal, and draining the effluent water through overflow from the U-shaped U-shaped outlet pipe.

Advantages of the Experimental Device

1. Low-oxygen aeration combined with real-time control not only facilitates the implementation of half partical nitrification, and provides a substrate for anammox, but also saves aeration energy consumption and reduces the treatment cost;
2. by-products of the anammox reaction are removed by autotrophic denitrification, which improves the denitrification efficiency of the system and the quality of the effluent water;
3. as an electron donor of autotrophic denitrifying bacteria, FeS has no toxic effect on anammox bacteria, and excessive FeS addition has no inhibitory effect on anxmmox bacteria; and
4. Both anammox bacteria and autotrophic denitrifying bacteria are chemoautotrophic microorganisms with $CO_2$ as a carbon source, and therefore, the complementarity of metabolic pathways and the consistency of proliferation rates of the two types of bacteria can achieve a stable coexistence relationship.

BRIEF DESCRIPTION OF THE DRAWINGS

FIG. 1 is a schematic diagram of a device of the present application.

The main reference signs are illustrated as follows:

1—raw water tank 2—half partical nitrification SBR reactor 3—intermediate water tank

4—upflow anammox coupled with autotrophic denitrification granular sludge reactor

1.1—inlet pump I 2.1—pH meter

2.2—aeration device 2.3—sludge discharge valve 2.4—drain valve

2.5—dissolved oxygen (DO) meter 2.6—air pump 2.7—barometer 2.8—stirring device

3.1—inlet pump II

4.1—temperature control device 4.2—water inlet valve 4.3—peristaltic pump

4.4—pH/DO meter 4.5—reflux inlet

4.6—U-shaped outlet pipe 4.7—gas collecting port

DETAILED DESCRIPTION

A raw water tank (1) is connected with a water inlet of a half partical nitrification reactor (2) via a water inlet pump I (1.1); a water outlet of the half partical nitrification reactor (2) is connected with an intermediate water tank (3) via a drain valve (2.4); a water inlet of an upflow anammox coupled with autotrophic denitrification granular sludge reactor (4) is connected with the intermediate water tank (3) via a water inlet pump II (3.1), and water is drained from a water outlet of the upflow anammox coupled with autotrophic denitrification granular sludge reactor (4) via a U-shaped outlet pipe (4.6).

1. A device for treatment of municipal sewage by half partical nitrification-anammox coupled with denitrification, wherein the device is provided with a raw water tank (1), a half partical nitrification reactor (2), an intermediate water tank (3) and an upflow anammox coupled with autotrophic denitrification granular sludge reactor (4): the raw water tank (1) is provided with a water inlet pump I; the half partical nitrification reactor (2) is provided with a pH meter (2.1), an aeration device (2.2), a dissolved oxygen (DO) meter (2.5), a gas flowmeter (2.7), an air pump (2.6), a stirring device (2.8), a drain valve (2.4) and a sludge discharge valve (2.3); the intermediate water tank (3) is provided with a water inlet pump II; an upflow anammox coupled with autotrophic denitrification granular sludge reactor (4) is provided with a temperature control device (4.1), a pH/DO meter (4.4), a U-shaped outlet pipe (4.6) and a gas collecting port (4.7);

connection of an experimental device: the raw water tank (1) is connected with a water inlet of the half partical nitrification reactor (2) via the water inlet pump I (1.1); a water outlet of the half partical nitrification reactor (2) is connected with the intermediate water tank (3) via the drain valve (2.4); a water inlet of the upflow anammox coupled with autotrophic denitrification granular sludge reactor (4) is connected with the intermediate water tank (3) via the water inlet pump II (3.1), and water is drained from a water outlet of the upflow anammox coupled denitrification granular sludge reactor (4) via the U-shaped outlet pipe (4.6).

2. Experimental steps (1) System Startup:

(1.1) startup of the half partical nitrification reactor: inoculating with partical nitrification floc sludge, and controlling the sludge concentration to be 2500-3000 mg/L, a hydraulic retention time to be 4-5 h, and a sludge age to be 10-15 d; and pumping sewage from the raw water tank into a reactor by a inlet pump per cycle, stirring under low-oxygen aeration, precipitating and draining water, wherein dissolved oxygen in the reactor is controlled to be 0.5-2.0 mg/L, a drainage ratio is 50%, a start-up process of the half partical nitrification SBR reactor is completed when a mass concentration ratio of $NH_4^+$—N to $NO_2^-$—N in effluent water of a half partical nitrification sequencing batch reactor (SBR) is 1-1.3, and the effluent water of the half partical nitrification SBR reactor is discharged into a regulating water tank; and (1.2) startup of the anammox coupled denitrification reactor: inoculating with anammox granular sludge, wherein the sludge has an average particle size of 0.3-0.5 mm; not actively draining sludge during operation; and controlling the temperature inside the reactor to be 30±1° C. by a temperature control device;

② performing enrichment culture on autotrophic denitrifying bacteria in an anoxic upflow anaerobic sludge blanket (UASB) reactor using simulated wastewater prepared from 30-50 mg/L of $Na_2S_2O_3$ and 20-40 mg/L of $NaNO_3$ as inlet water, controlling the temperature inside the reactor to be 30±1° C. by the temperature control device, and adjusting a pH to 7-8; and analyzing microbial abundance in the sludge after culture for 3 months or above, wherein when the flora abundance is greater than 10%, the culture is completed; and ③ mixing anammox sludge with denitrification sludge according to sludge concentration, wherein the concentration of the anammox sludge is greater than or equal to 5 times of the concentration of the denitrification sludge; adding FeS into the mixed sludge, wherein the mass concentration of FeS added in each IL reactor is 10-20% of the mass concentration of ammonia nitrogen in inlet water in the reactor; and controlling the concentration of sludge in the reactor after mixing to be 4000-5000 mg/L, a rising flow rate to be 0.5 m/h, and the hydraulic retention time to be 150-160 min, wherein the reactor startup was considered to be successful when both the concentration of $NH_4^+$—N and the concentration of $NO_2^-$—N in effluent water of the reactor are less than 5 mg/L; and (2) Operation After Successful Startup:

(2.1) allowing domestic sewage to enter the half partical nitrification reactor via the water inlet pump I, starting anoxic/oxic (AO) operation, and allowing the SBR reactor to undergo five processes of water inlet, reaction, standing, precipitation, and water outlet, specifically performing anaerobic stirring after the water inlet, and carrying out a reaction for 30-60 min to remove organic matters in water; then, starting the air pump, performing aerobic stirring, controlling dissolved oxygen to be 0.3-2 mg/L by adjusting the gas flowmeter, and carrying out a half partical nitrification reaction for 3-4 h; and allowing the stirred material to stand for precipitation for 30-60 min after stirring was finished, opening the drain valve, and controlling the sludge age to be 10-15 d through regular sludge discharge, wherein a drainage ratio is 50%, and the mass concentration ratio of $NH_4^+$—N to $NO_2^-$—N in reaction effluent water is 1-1.32; and (2.2) allowing SBR effluent water containing $NH_4^+$—N and $NO_2^-$—N to enter the intermediate water tank, and pumping sewage of the intermediate water tank into the anammox coupled denitrification reactor by the water inlet pump II; controlling the hydraulic retention time of the UASB to be 3-6 h, i.e., controlling the flow rate to be 1 L/h-3 L/h; not actively draining sludge during operation; controlling the temperature inside the reactor to 30±1° C. by the temperature control device; converting $NH_4^+$—N and $NO_2^-$—N in inlet water to $N_2$ under the action of anammox bacteria in the reactor; while using FeS as an electron donor of autotrophic denitrifying bacteria to react with $NO_3^-$—N to produce $NO_2^-$—N, and draining the effluent water through overflow from the U-shaped outlet pipe.

What is claimed is:

1. A method of treatment of municipal sewage by half partial nitrification-anammox coupled with sulfur autotrophic denitrification, comprising providing a device for treatment of municipal sewage by half partial nitrification-anammox coupled with sulfur autotrophic denitrification, providing the device with a raw water tank, a half partial nitrification reactor, an intermediate water tank and an upflow anammox coupled autotrophic denitrification granular sludge reactor;

providing the raw water tank with a water inlet pump I;

providing the half partial nitrification reactor with a pH meter, an aeration device, a dissolved oxygen (DO) meter, a gas flowmeter, an air pump, a stirring device, a drain valve and a sludge discharge valve;

providing the intermediate water tank with a water inlet pump II;

providing the upflow anammox coupled autotrophic denitrification granular sludge reactor with a temperature control device, a pH/DO meter, a U-shaped outlet pipe and a gas collecting port;

the raw water tank connected with a water inlet of the half partial nitrification reactor via the water inlet pump I;

a water outlet of the half partial nitrification reactor is connected with the intermediate water tank via the drain valve;

a water inlet of the upflow anammox coupled autotrophic denitrification granular sludge reactor connected with the intermediate water tank via the water inlet pump II, and a water outlet of the upflow anammox coupled autotrophic denitrification granular sludge reactor connected to the U-shaped outlet pipe for water drainage;

Step 1 commencing system startup:

Step 11 commencing startup process of the half partial nitrification reactor:

inoculating with partial nitrification floc sludge, and controlling the sludge concentration to be 2500-3000 mg/L, a hydraulic retention time to be 4-5 h, and a sludge age to be 10-15 d; and pumping sewage from the raw water tank into the half partial nitrification reactor by a inlet pump per cycle, stirring for 3-5 h under low-oxygen aeration, precipitating and draining water, wherein dissolved oxygen is controlled to be 0.5-2.0 mg/L, a drainage ratio is 50%, the start-up process of the half partial nitrification reactor is completed when a mass concentration ratio of $NH_4^+$—N to $NO_2^-$—N in effluent water of the half partial nitrification reactor is 1-1.3, and discharging the effluent water of the half partial nitrification reactor into the intermediate water tank; and Step 12, commencing startup of the upflow anammox coupled autotrophic denitrification granular sludge reactor;

Step 121, inoculating with anammox granular sludge, wherein the sludge has an average particle size of 0.3-0.5 mm; not actively draining sludge during operation; and controlling the temperature inside the upflow anammox coupled autotrophic denitrification granular sludge reactor to be 30±1° C. by use of the temperature control device;

Step 122, performing enrichment cultivation on autotrophic denitrifying bacteria in the upflow anammox coupled autotrophic denitrification granular sludge reactor using simulated wastewater prepared from 30-50 mg/L of $Na_2S_2O_3$ and 20-40 mg/L of $NaNO_3$ as inlet water, controlling the temperature inside the upflow anammox coupled autotrophic denitrification granular sludge reactor to be 301° C. by use of the temperature control device, and adjusting a pH to 7-8, and analyzing microbial abundance in the sludge after cultivating for 3 months or above, 1wherein when the flora abundance is greater than 10%, the cultivating is completed; and Step 123, mixing anammox sludge with denitrification sludge according to sludge concentration, wherein the concentration of the anammox sludge is greater than or equal to 5 times of the concentration of the denitrification sludge;

adding FeS into the mixed sludge, wherein the mass concentration of FeS added in each 1L reactor is 10-20% of the mass concentration of ammonia nitrogen in inlet water in the upflow anammox coupled autotrophic denitrification granular sludge reactor; and controlling the concentration of sludge in the reactor after mixing to be 4000-5000 mg/L, a rising flow rate to be 0.5m/h, and the hydraulic retention time to be 150-160 min, wherein the upflow anammox coupled autotrophic denitrification granular sludge reactor startup is considered to be successful when both the concentration of $NH_4^+$—N and the concentration of $NO_2^-$–N in effluent water of the reactor are less than 5 mg/L; and Step 2, commencing operation after successful startup:

Step 21, allowing domestic sewage to enter the half partial nitrification reactor via the water inlet pump I, starting anoxic/oxic (AO) operation, and allowing the half partial nitrification reactor to undergo five processes of water inlet, reaction, standing, precipitation, and water outlet, specifically performing anaerobic stirring after the water inlet, and carrying out a reaction for 30-60 min to remove organic matters in water;

then, starting the air pump, performing aerobic stirring, controlling dissolved oxygen to be 0.3-2 mg/L by adjusting the gas flowmeter, and carrying out a half partial nitrification reaction for 3-4 h; and allowing the stirred material to stand for precipitation for 30-60 min after stirring is finished, opening the drain valve, and controlling the sludge age to be 10-15 d through regular sludge discharge, wherein a drainage ratio is 50%, and the mass concentration ratio of $NH_4^+$—N to $NO_2^-$—N in effluent water of the half partial nitrification reactor is 1-1.32; and Step 22, allowing the effluent water of the half partial nitrification reactor containing $NH_4^+$—N and $NO_2^-$—N to enter the intermediate water tank, and pumping sewage of the intermediate water tank into the upflow anammox coupled autotrophic denitrification granular sludge reactor by the water inlet pump II;

controlling the hydraulic retention time of the upflow anammox coupled autotrophic denitrification granular sludge reactor to be 3-6 h, by controlling the flow rate to be 1 L/h-3 L/h;

not actively draining sludge during operation;

controlling the temperature inside the upflow anammox coupled autotrophic denitrification granular sludge reactor to 30±1 C by use of the temperature control device;

converting $NH_4^+$—N and $NO_2^-$—N in inlet water to N2 under the action of anammox bacteria in the upflow anammox coupled autotrophic denitrification granular sludge reactor, while using FeS as an electron donor of autotrophic denitrifying bacteria to react with $NO_3^-$—N to produce $NO_2^-$—N, and draining the effluent water through overflow from the U-shaped outlet pipe.

* * * * *